(12) United States Patent
Choi et al.

(10) Patent No.: US 9,124,944 B1
(45) Date of Patent: Sep. 1, 2015

(54) SYNCHRONIZATION OF CONTROL SIGNAL TRANSMISSIONS FOR A MULTICAST SERVICE

(75) Inventors: Jihwan P. Choi, San Jose, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 883 days.

(21) Appl. No.: 13/292,720

(22) Filed: Nov. 9, 2011

Related U.S. Application Data

(60) Provisional application No. 61/415,772, filed on Nov. 19, 2010.

(51) Int. Cl.
*H04L 12/28* (2006.01)
*H04N 21/6405* (2011.01)
*H04J 1/16* (2006.01)
*H04L 12/18* (2006.01)

(52) U.S. Cl.
CPC ........ *H04N 21/6405* (2013.01); *H04L 12/1845* (2013.01)

(58) Field of Classification Search
USPC .......................................... 370/252, 328, 389
See application file for complete search history.

(56) References Cited

U.S. PATENT DOCUMENTS

| 2002/0184314 | A1* | 12/2002 | Riise ............................. | 709/205 |
| 2008/0045224 | A1* | 2/2008 | Lu et al. ......................... | 455/446 |
| 2008/0205322 | A1* | 8/2008 | Cai et al. ....................... | 370/312 |
| 2011/0002379 | A1* | 1/2011 | Raveendran .............. | 375/240.01 |

OTHER PUBLICATIONS

3GPP TS 36.300 v9.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," $3^{rd}$ Generation Partnership Project (3GPP™), Jun. 2010.

3GPP TS 36.321 V9.3.0, "3rd Generation Partnership Project; Technical Specification Group Radio Access Network; Evolved Universal Terrestrial Radio Access (E-UTRA); Medium Access Control (MAC) protocol specification (Release 9)," $3^{rd}$ Generation Partnership Project (3GPP™), Jun. 2010.

3GPP TS 36.331 V9.3.0, "3rd Generation Partnership Project; Technical Specification Group Radio Access Network; Evolved Universal Terrestrial Radio Access (E-UTRA); Radio Resource Control (RRC); Protocol specification (Release 9)," $3^{rd}$ Generation Partnership Project (3GPP™), Jun. 2010.

(Continued)

*Primary Examiner* — John Pezzlo

(57) ABSTRACT

In a method for transmitting control signals in a multicast communication system, wherein the multicast communication system broadcasts one or more multicast channels, one or more occurrences of a first control signal are transmitted. The first control signal includes at least control information corresponding to the one or more multicast channels. Additionally, one or more occurrences of a second control signal are transmitted for each of the one or more multicast channels. The second control signal includes at least control information corresponding to the respective multicast channel. At least one transmission of an occurrence of the second control signal is synchronized with at least one transmission of an occurrence of the first control signal.

23 Claims, 8 Drawing Sheets

(56) References Cited

OTHER PUBLICATIONS

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

"IEEE Std 802.16 2009 (Revision of IEEE Std. 802.16-2004), IEEE Standard for Local and metropolitan area networks: Part 16: Air Interface for Broadband Wireless Access Systems," *The Institute of Electrical and Electronics Engineers, Inc.,* May 29, 2009.

"IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1," *The Institute of Electrical and Electronics Engineers, Inc.,* Feb. 28, 2006.

"IEEE P802.11n™/D3.00, Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.,* Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.,* Oct. 2009.

"Long Term Evolution (LTE): A Technical Overview," Technical White Paper, Motorola, Inc., 2007.

\* cited by examiner

SYNCHRONIZATION OF CONTROL SIGNAL TRANSMISSIONS FOR A MULTICAST SERVICE

CROSS-REFERENCES TO RELATED APPLICATIONS

This disclosure claims the benefit of U.S. Provisional Patent Application No. 61/415,772 filed on Nov. 19, 2010, which is hereby incorporated by reference herein in its entirety.

FIELD OF THE DISCLOSURE

The present disclosure relates generally to communication networks and, more particularly, to synchronizing multicast control signals.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a multicast communication system, a network device broadcasts data to multiple other communication devices. Multicast communication systems generally employ multiple control signals, or control channels, to communicate to the receiving devices certain information characterizing an ongoing broadcast service, and characterizing individual broadcast channels within the broadcast. Such control signals are periodically transmitted from the broadcasting network device to the receiving devices to communicate current system information.

SUMMARY

In one embodiment, a method for transmitting control signals in a multicast communication system, wherein the multicast communication system broadcasts one or more multicast channels, includes transmitting one or more occurrences of a first control signal, wherein the first control signal includes at least control information corresponding to the one or more multicast channels. The method also includes transmitting one or more occurrences of a second control signal for each of the one or more multicast channels, wherein the second control signal includes at least control information corresponding to the respective multicast channel, and wherein at least one transmission of an occurrence of the second control signal is synchronized with at least one transmission of an occurrence of the first control signal.

In another embodiment, an apparatus for transmitting control signals in a multicast communication system, wherein the multicast communication system broadcasts one or more multicast channels. The apparatus includes a scheduler configured to schedule one or more occurrences of a first control signal, wherein the first control signal includes at least control information corresponding to the one or more multicast channels. The scheduler is also configured to schedule one or more occurrences of a second control signal for each of the one or more multicast channels, wherein the second control signal includes at least control information corresponding to the respective multicast channel, and wherein at least one occurrence of the second control signal is scheduled to be synchronized with at least one occurrence of the second control signal. The apparatus further includes a network interface configured to transmit the one or more occurrences of the first control signal and the one or more occurrences of the second control signal.

DETAILED DESCRIPTION

In embodiments described below, a wireless network device such as an evolved node base device (eNB) of a communication network transmits to and receives from one or more other wireless network devices, such as a user equipment device (UE). eNB and UE correspond to terminology used in the $3^{rd}$ Generation Partnership Project Long Term Evolution (3GPP LTE) Standard. The apparatus and methods discussed herein, however, are not limited to 3GPP LTE networks. Rather, the apparatus and methods discussed herein may be utilized in other types of wireless communication networks as well. For instance, another example system that may utilize embodiments of apparatus and methods described herein is a technology promulgated by the Worldwide Interoperability for Microwave Access (WiMAX) Forum (such systems conform to the Institute for Electrical and Electronics Engineers (IEEE) 802.16e Standard). In WiMAX, a base station (BS) corresponds to the eNB of 3GPP LTE, and a mobile station (MS) corresponds to the UE. In other embodiments, other types of systems may utilize apparatus and methods described herein such as communication systems that conform to the IEEE 802.16 Standard, wireless local area network (WLAN) systems such as systems that conform to the IEEE 802.11n Standard, etc. For ease of explanation, the description below refers to eNBs and UEs.

Figure 1:
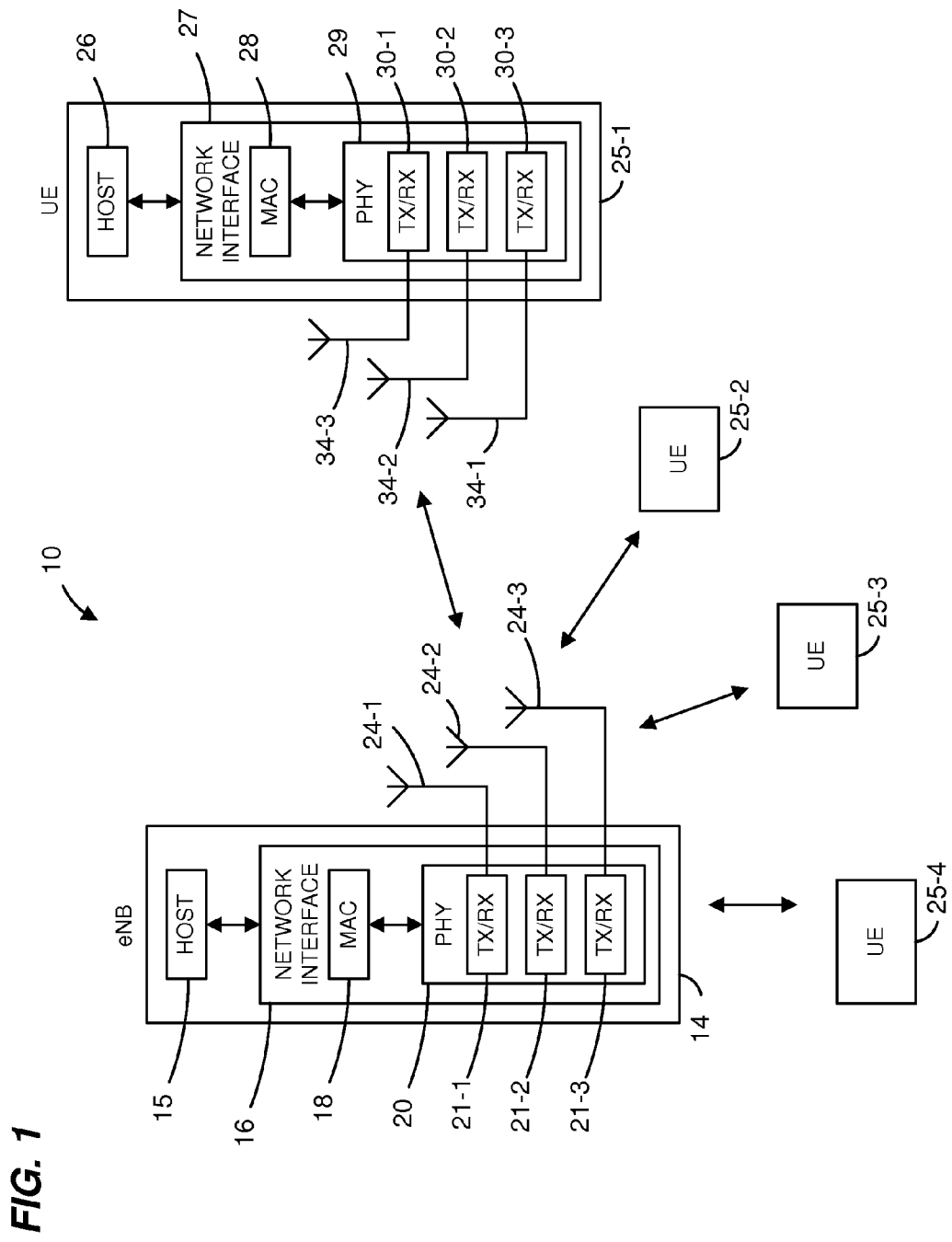
FIG. 1 is a block diagram of an example wireless communication network which supports multicast broadcasting, according to an embodiment.

FIG. 1 is a block diagram of an example wireless communication network 10 which supports multicast broadcasting, such as multicast broadcast multimedia service (MBMS), according to an embodiment. An eNB 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers are coupled to a plurality of antennas 24. Although three transceivers 21 and three antennas 24 are illustrated in FIG. 1, the eNB 14—includes different numbers (e.g., 1, 2, 4, 5, etc.) of transceivers 21 and antennas 24 in other embodiments.

The network 10 includes a plurality of UEs 25. Although four UEs 25 are illustrated in FIG. 1, the network 10—includes different numbers (e.g., 1, 2, 3, 5, 6, etc.) of UEs 25 in various scenarios and embodiments. The UE 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In various embodiments, one or more of the UEs 25-2, 25-3, and 25-4 has a structure the same as or similar to the client station 25-1.

In an embodiment, the PHY processing unit 20 and/or the MAC processing unit 18 of the eNB 14 is configured to utilize synchronization techniques for multicast service control signals when broadcasting to all or a portion of the UEs 25.

In some embodiments, in a multicast or a broadcast mode, the eNB 14 broadcasts one or more multicast control signals to communicate to one or more of the UEs 25 various control and scheduling parameters defined for an MBMS service. For example, in one such embodiment, the eNB 14 utilizes two multicast control signals, each signal being periodically broadcast to the UEs 25. In this embodiment, a first control signal is used to communicate to the UEs 25 general information about an ongoing MBMS service, such as, for example, information defining a number of MBMS sessions, or multicast channels, included in the ongoing service. A second control signal is used to define specifics of each of the multicast channels defined by the first control signal, such as, for example, information defining one or more specific traffic channels that are transmitted utilizing a particular multicast channel. The terms "multicast" and "broadcast" as used herein are interchangeable and are intended to generally refer to point-to-multipoint transmissions from the eNB 14 to all or some of the UEs 25 (or, as further described below with respect to FIG. 8, multipoint-to-multipoint transmissions from multiple eNBs to all or a subset of UEs).

Figure 2:
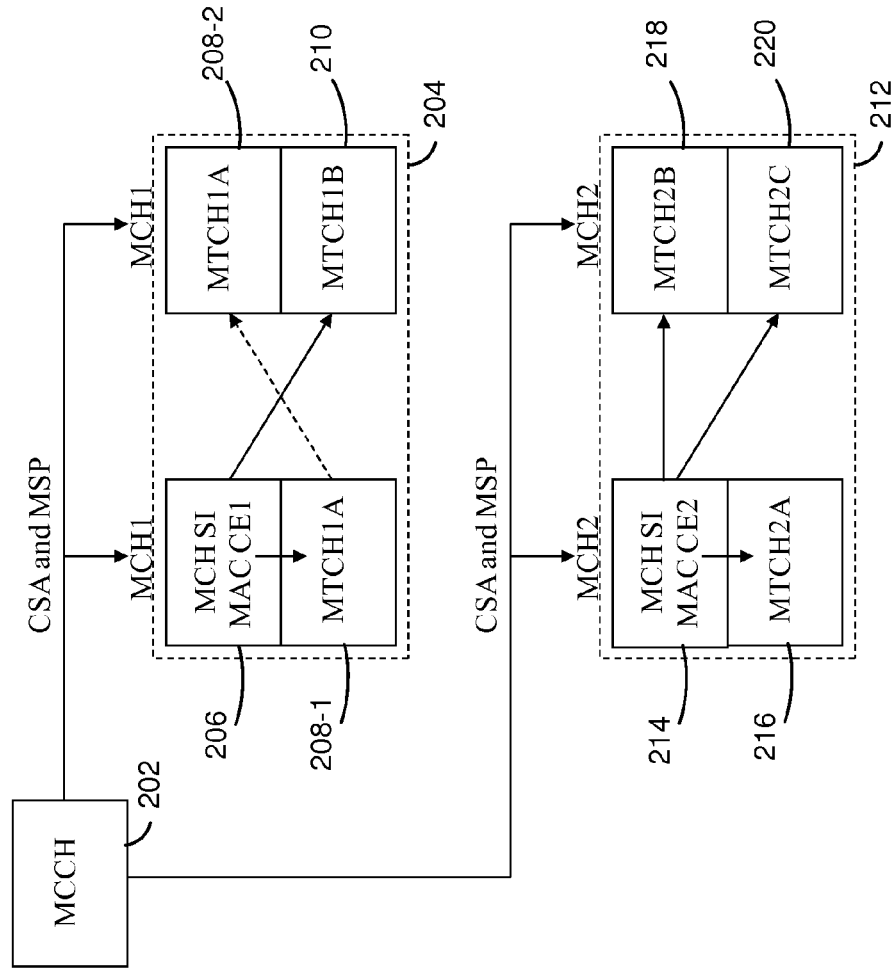
FIG. 2 is a diagram of a multicast broadcast multimedia service (MBMS) service which utilizes multiple multicast control signals, according to an embodiment.

FIG. 2 is a diagram of an MBMS service 200 which utilizes multiple multicast control signals, according to an embodiment. The MBMS service 200 includes a multicast control channel (MCCH) 202 used to communicate MBMS configuration information to one or more user stations. In an embodiment, MCCH 202 includes control data to enable reception of multicast transmissions. In an embodiment, MCCH 202 includes control data generally defining the MBMS service 200, such as a session list, or a list of muticast channels included in the ongoing MBMS service, a common subframe allocation pattern defining subframes allocated for the MBMS ("MBMS subframes"), and the modulation and coding scheme (MCS) used for transmitting the MBMS data (e.g., user data corresponding to each MBMS session). In the example embodiment of FIG. 2, MBMS 200 includes two multicast channels, MCH1 204 and MCH2 212, and, accordingly, in this system, MCCH 200 includes control data to enable reception of MCH1 204 and MCH2 212, e.g., a session list defining multicast sessions MCH1 204 and MCH2 212.

Each of the multicast sessions, MCH1 and MCH 2, includes a respective second control signal, multicast channel scheduling information media access control control element (MCH SI MAC CE), MCH SI MAC CE1 206 and MCH SI MAC CE2 214, respectively, which further defines the corresponding multicast session, e.g., includes control data to enable reception of multicast transmissions. For example, an MCH SI MAC CE includes information indicative of specific subframes, within the MBMS subframes as defined by MCCH 202, that are allocated to different traffic (or data) channels within the respective MBMS session. Particularly, MCH SI MAC CE1 includes information indicative of subframes allocated to each of the MTCH1A 208 and the MTCH1B 210. Similarly, MCH MAC CE2 includes information indicative of subrames allocated to each of the traffic channels MTCH2A 216, MTCH2B 218, and MTCH2C 220.

Figure 3:
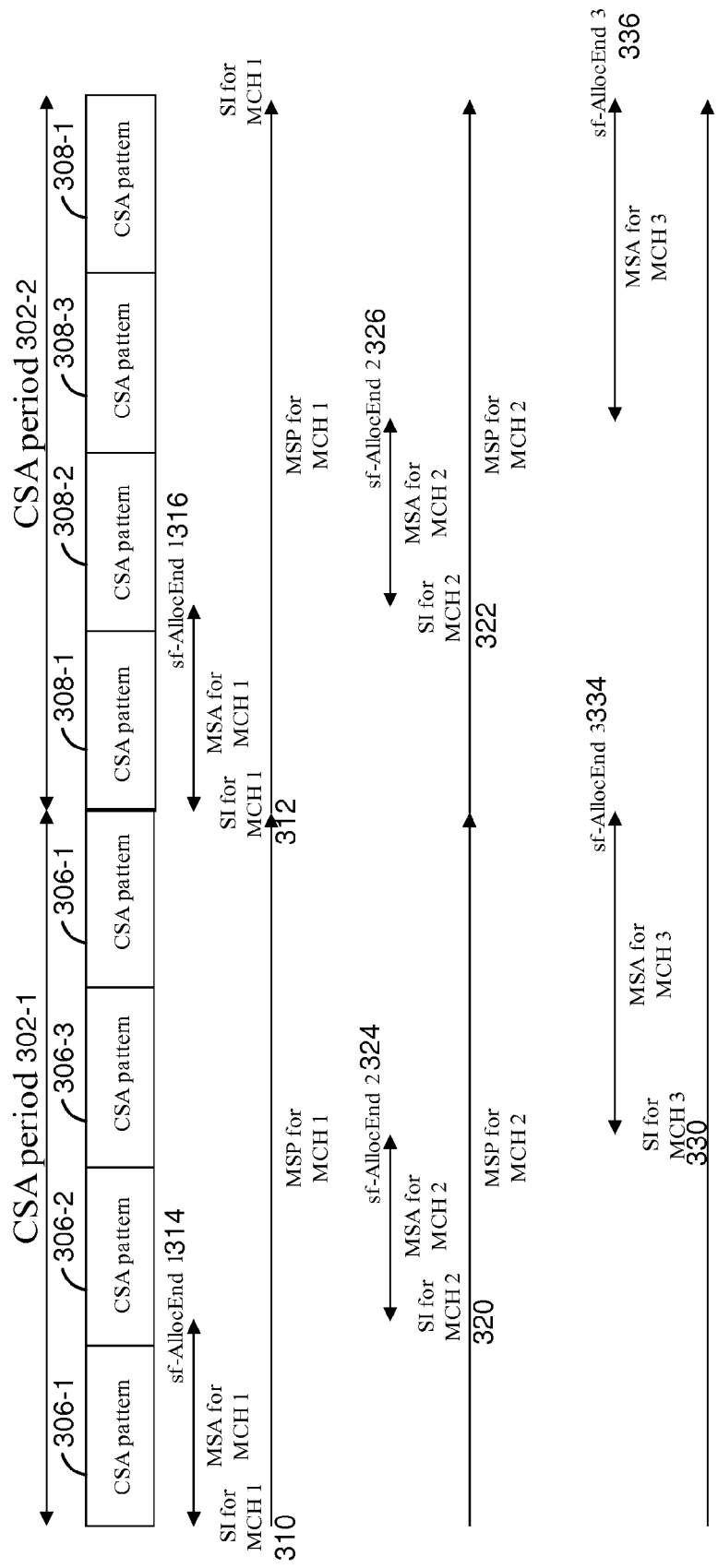
FIG. 3 is an example scheduling scheme for an MBMS service, according to an embodiment.

FIG. 3 is an illustration of an example scheduling scheme for an MBMS configuration 300, according to an embodiment. In the MBMS configuration 300, three multicast channels—MCH1, MCH2, and MCH3—time share a common subframe allocation (CSA) period defined for the MBMS service. For illustrative purposes, FIG. 3 illustrates two CSA periods, CSA period 302-1 and CSA period 302-2. Of course, in various embodiments and/or scenarios, an MBMS configuration includes any suitable number of CSA periods (e.g., 1, 3, 4, 5, etc.). In an example embodiment, a particular CSA period is defined as a number of frames included in the CSA period, where the specific number of frames in a CSA period is selected from the set $\{4, 8, \ldots, 256\}$. In other embodiments, a CSA period is defined as any other suitable number frames or is defined in another suitable manner (e.g., as a number of subframes, as a period of time, etc.)

Each of CSA pattern 306 and the CSA pattern 308 defines, in a respective CSA period 302-1, the specific subframes that are allocated for the MBMS service, i.e. "MBMS subframes". As an illustrative example, in an embodiment, a radio frame includes ten subframes indexed $\{0, 1, \ldots, 9\}$, and subframes $\{1, 2, 3, 6, 7, 8\}$ are reserved for MBMS. In this embodiment, a particular CSA pattern (e.g., CSA pattern 306 and/or CSA pattern 308) defines the set $\{1, 2, 3, 6, 7, 8\}$, or a subset thereof, as the subframes allocated for the particular MBMS service. In other embodiments, a different radio frame structure is utilized, and a different set of subframes is allocated to MBMS. In an embodiment, subframes that are not allocated to MBMS are used for other types of communication, such as, for example, unicast, or point-to point, communication between the eNB 14 and a UE 25-*i*.

The defined CSA pattern repeats a number of times within the CSA period. In the MBMS configuration 300, each of the CSA patterns 306-*i* and each of the CSA patterns 308-*i* covers one radio frame and repeats four times within the respective CSA period. In other embodiments and/or scenarios, a CSA pattern covers more than one radio frame and/or repeats a different number of times within a CSA period. In one embodiment, a number of specific CSA patterns are pre-defined, and a particular one of the predefined patterns is indicated as the CSA pattern being utilized for a particular MBMS. For example, eight different CSA patterns are defined in one embodiment, and one of the eight patterns is indicated as the pattern being utilized for a service. In other embodiments, a different number of suitable CSA patterns is defined. Further, as discussed above, in some embodiments, a CSA pattern covers more than one radio frame (e.g., 2, 3, 4, etc. radio frames), thereby allowing different patterns to be assigned for different frames within the CSA period.

For each MCH, a corresponding indicator (sf-AllocEnd) indicates the last subframe used for transmitting data for the corresponding MCH. In an embodiment, a next MCH immediately follows a previous MCH, or, in other words, transmission of a next MCH begins in a next MBMS subframe following the last MBMS subframe corresponding to the previous channel. In this way, sf-AllocEnd also serves as an indication of the beginning of the next MCH if more MCH channels remain to be transmitted (or received). Accordingly, in the MBMS configuration 300, each of sf-AllocEnd 1 314 and sf-AllocEnd 1 316 indicates, in the CSA period 302-1 and 302-2, respectively, the end of MCH1 and also indicates the beginning of transmission of MCH2 (in the next available MBMS subframe). Similarly, in each CSA period 302-1 and 302-2, a respective sf-AllocEnd 2 (324 or 326) indicates the end of MCH2 and also indicates the beginning of MCH3 (in the next available MBMS subframe). An sf-AllocEnd 334 indicates the end MCH3, which, in the example embodiment, is the last MCH included in the MBMS and is therefore followed by transmission of MCH1 in the next CSA period (CSA period 302-2). In an embodiment, each of the sf-AllocEnd1, each of the sf-AllocEnd2, and each of the sf-AllocEnd3 is indicated as a subframe number, with a maximum possible value of 1536. In other words, in this embodiment, an MCH has a maximum duration of 1536 MBMS subframes in a single CSA period.

An MCH scheduling period (MSP) for each MCH defines periodicity of transmission of control information specific to each MCH. In an embodiment, such control information is included in a first MBMS subframe of the respective MCH and is repeated with a period equal to MSP. In the embodiment of FIG. 3, this control information is included in a scheduling information (SI) signal for the corresponding MCH. As shown, SI for MCH1 310, SI for MCH2 320, and SI for MCH 3 330 is transmitted in the first subframe corresponding to the respective channel, and is transmitted with periodicity indicated by the MSP for the corresponding MCH. More specifically, MSP for each of MCH1 and MCH2 corresponds to the duration of one CSA period, and accordingly, SI for each of MCH1 and MCH2 is transmitted at the beginning of every transmission of the corresponding channel in each CSA period. MSP for MCH3, on the other hand, corresponds to the duration of two CSA periods, and, accordingly, SI for MCH3 is transmitted once in the two CSA periods (i.e., SI for MCH 3 330 in the CSA period 302-1). Accordingly, the occurrence of MCH3 in the CSA period 302-2 does not include an SI signal.

According to an embodiment, an MSP for each MCH in an MBMS is defined by a number of radio frames included the MSP, with the particular number selected for the set {8, 16, . . . , 1024}. In other embodiments, MSP is defined as any other suitable number of frames, or is defined in any other suitable manner (e.g., a number of subframes, as a period of time, etc.). In an embodiment, each MCH SI in an MBMS includes scheduling information for one or more multicast traffic channels (MTCH) transmitted using the corresponding MCH. In an embodiment, a first MTCH is transmitted entirely before the start of transmission of a second MTCH. In one embodiment, duration of a MTCH is limited to a maximum of 2048 frames.

With reference to FIG. 2, MCCH 202 includes control information indicative of the CSA pattern (e.g., CSA pattern 306 and/or CSA pattern 308) and the CSA period (CSA period 302) defined for a particular MBMS configuration, and a (P)MCH info list containing a SF-AllocEnd value and an MSP for each ongoing MBMS session, according to an embodiment. Generally, any number of MCH channels can be included in an MBMS service, and control information for each MCH is included in the corresponding (P)MCH info list, according to an embodiment. For example, in one embodiment, (P)MCH info list includes control information for up to 15 multicast channels. Referring again to FIG. 2, the MCH SI MAC CE1 206 corresponds to an SI of FIG. 3, such as SI for MCH 1. Similarly, MCH SI MAC CE2 214 corresponds to an SI of FIG. 2, such as, for example, SI for MCH 2.

According to an embodiment, each occurrence of an MCCH control signal and each occurrence of an MCH SI MAC CE control signal (e.g., SI for MCH1, SI for MCH2, and SI for MCH3 in FIG. 3) is transmitted using a modulation and coding scheme (MCS) corresponding to a lower data rate compared to the data rate associated with the MCS used for transmitting MBMS data. Using a low data rate MCS generally makes reception of MBMS control information more robust. On the other hand, as a consequence of the lower MCS used for control signals, a UE receiving an MBMS data stream needs to switch to a lower data rate MCS each time a control signal is received, thereby generally reducing throughput. In order to simplify UE design and to increase throughput, in an embodiment, at least some occurrences of MBMS control signal transmissions are synchronized (e.g., transmitted in the same subframe) thereby reducing the number of MCS changes on the transmitting end (e.g., at eNB 14, FIG. 1) and/or the receiving end (e.g., UE 25-$i$ of FIG. 1). In a synchronized scheduling scheme, according to an embodiment, at least some subframes containing MCCH signals coincide with at least some subframes containing MAC SI CE signals.

In a model used to design a synchronized MBMS scheduling scheme according to an embodiment, the MCCH period is represented by $P_m$, and the MCCH offset is represented by $Q_m$. The offset $Q_m$ defines the specific frame number, within MCCH period $P_m$, of the frame that includes MCCH. Further, $S_m$ represents a set of possible subframes, within a radio frame, that can be used for MCCH transmission. In an embodiment, the set $S_m$ corresponds to the CSA pattern defined for a MBMS.

Similarly, a MAC SI CE transmission period (MSP) for each MCH, included in an MBMS service is represented by $P_i$. Further, for each $MCH_i$, a corresponding MAC SI CE offset is represented by $Q_i$. In an embodiment, $Q_i$ is defined as a sum of offsets (in number of frames) defining MAC CH CE locations for each occurrence of an SI signal for the corresponding channel. That is, in an embodiment, Qi= q+floor($q_{i-1}$/L), where q is a radio frame allocation offset defined for the $MCH_i$, $q_{i-1}$ is the Sf-AllocEnd defined for the previous channel ($MCH_{i-1}$) for each i, L is the number of subframes allocated for MBMS signals in a radio frame, and floor( ) denotes the floor function. Further, $S_i$ represents a set of possible subframes, within a radio frame, that can be used for MAC SI CE transmission.

In an embodiment, all periods are defined as powers of 2. Accordingly, in this embodiment, the MCCH period $P_m$ is a power of 2, and each of the MAC SI CE periods $P_i$ is also a power of 2. Accordingly, in this embodiment, any smaller $P_m$ or $P_i$ is an integer multiple of a greater $P_m$ or $P_i$.

Figure 4:
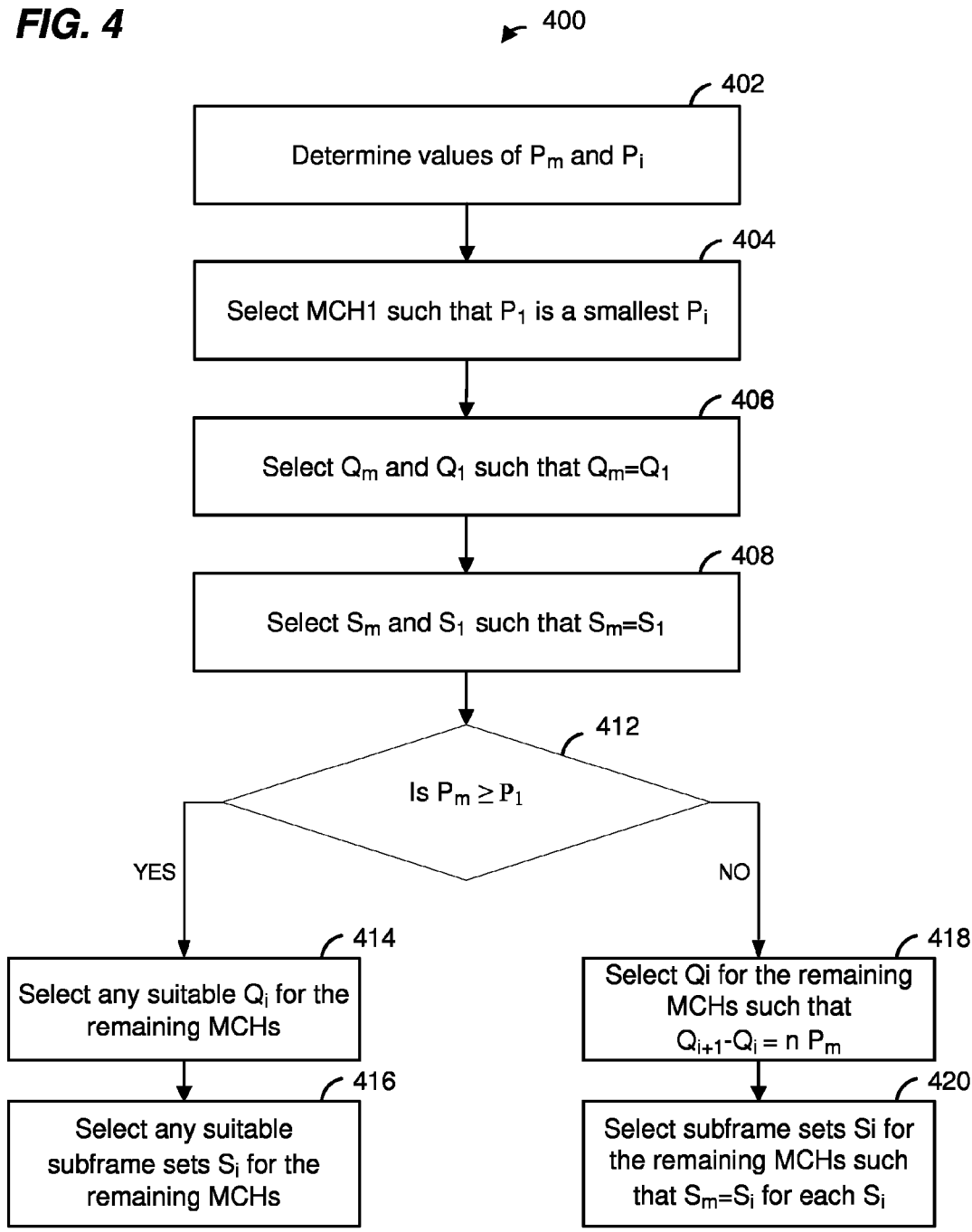
FIG. 4 is a flow diagram of a synchronized MBMS control signal scheduling technique, according to an embodiment.

FIG. 4 is a flow diagram illustrating an example scheduling technique 400 for a synchronized scheduling scheme, according to an embodiment. In an embodiment, the eNB 14 utilizes the scheduling technique 400 to determine MBMS control signal parameters. For example, the eNB 14 includes a scheduler configured to implement the scheduling technique 400, according to an embodiment. In an embodiment, upon determining the synchronized scheme parameters, the eNB 14 also transmits the determined parameters to the UEs 25.

At block 402, values of MCCH period $P_m$ and MAC SI CE periods $P_i$ for each MCH, included in the MBMS service are determined based on traffic demand and scheduling priorities. The periods $P_m$ and $P_i$ are selected at block 402 such that any greater period is an integer multiple of a smaller period, according to an embodiment. At block 404, the first multicast channel in a CSA period (e.g., $MCH_1$) is selected such that $P_1$ corresponds to a smallest $P_i$ of the MAC SI CE periods $P_i$ determined at block 402.

At block 406, the offset $Q_m$ and the offset $Q_1$ are selected such that $Q_m=Q_1$. Similarly, at block 408, the subframe sets $S_m$ and $S_1$ are selected such that $S_m=S_1$.

At block 414, $P_m$ determined at block 402 is compared to $P_1$ determined at block 404. If it is determined at block 414 that $P_m$ is greater than or equal to $P_1$, then, at block 414, any suitable offset value is selected for each of the remaining offsets (i.e., $Q_2, Q_3, \ldots, Q_N$ where N is the number of MCH included in the MBMS). Similarly, at block 416, any suitable set is selected for each of the remaining subframe sets (i.e., $S_2, S_3, \ldots, S_N$ where N is the number of MCH included in the MBMS).

On the other hand, if it is determined at block 414 that $P_m$ is less than $P_1$, then values for the remaining offsets $Q_2, Q_3, \ldots, Q_N$, are selected such that $Q_{j+1}-Q_j$ is an integer multiple of $P_m$ for $j=1, 2, \ldots N-1$. In an embodiment, the particular $Q_j$ value depends on traffic demand for the particular MCH and on MBMS scheduling priorities.

At block 420, the remaining sets $S_i$ are determined for the remaining channels such that $Sm=S_i$ for every i. In this case, the set of possible subframes for transmission of MCCH corresponds to the set of possible subframes for transmission of MAC SI CE for each MCH.

As an illustrative example of the scheduling technique 400, let possible values for $P_m$ be 32, 64, 128, and 256 frames and let Qm be an integer number of frames in the range of 0 to 10. The possible values for $S_m$ are given by the set $\{1, 2, 3, 6, 7, 8\}$ for a frequency division duplexing (FDD) system, or the set $\{3, 4, 7, 8, 9\}$ for time division duplexing (TDD) system. Let the possible values for $P_i$ be 8, 16, 32, 64, 128, 256, 512, or 1024 frames and let the offset(s) $Q_i$ be in the range of 0 to the number of frames included in the CSA period. Further, assume the possible values for $S_i$ to be the same as the possible values for $S_m$. That is, the possible values for $S_i$ in this example are given as the set $\{1, 2, 3, 6, 7, 8\}$ for a frequency division duplexing (FDD) system, or the set $\{3, 4, 7, 8, 9\}$ for time division duplexing (TDD) system.

Using the above defined parameters, in an MBMS that includes three MCH channels (N=3) with $P_i$ equal to 32, 32, and 64, and assuming that $P_m$ is equal to 32, where the values for $P_m$ and each $P_i$ are selected based on traffic demand and scheduling priorities. In accordance with the scheduling scheme 600, $MCH_1$ is selected such that $P_1$ is equal to 32. In this example, $MCH_2$ is then selected such that $P_2$ is equal to 32, and $MCH_3$ is selected such that $P_3$ is equal to 64. Accordingly, this is a case in which $P_m \geq P_1$. $Q_m$ is selected accordingly, such that $Q_m=Q_1$, for example, $Q_m=Q_1=0$. $Q_2$ and $Q_3$ are assigned any suitable numbers, for example $Q_2=34$ and $Q_3=70$. Similarly, $S_m$ is selected such that $S_m=S_1$, for example, $S_m=S_i=\{3, 7, 8\}$, and any suitable set is selected for each of $S_2$ and $S_3$, for example, $S_2=\{2, 3, 7, 8\}$ and $S_3=\{1, 2, 3, 7, 8\}$.

Another example illustrates a case in which $P_m$ is less than $P_1$. Assuming again that the MBMS configuration includes three multicast channels (N=3) with respective Pi values being equal to 128, 128, and 256, $MCH_1$ is selected such that $P_1$ is equal to 128. In this example, $P_m$ is equal to 32. $MCH_2$ is selected such that $P_2$ is equal to 128, and $MCH_3$ is selected such that $P_3$ is equal to 256. $Q_m$ is selected such that $Q_m=Q_1$, for example, $Q_m=Q_1=0$. Further, because in this case $P_m$ is less than $P_1$, $Q_2$ and $Q_3$ are selected to be integer multiples of $P_m$. For example, $Q_2=1*P_m=3^2$, and $Q_2=2*P_m=64$. Similarly, the subframe sets in this case are selected such that $S_m=S_1=S_2=S_3$, for example, $S_m=S_1=S_2=S_3=\{1, 2, 3, 6, 7, 8\}$.

Figure 5:
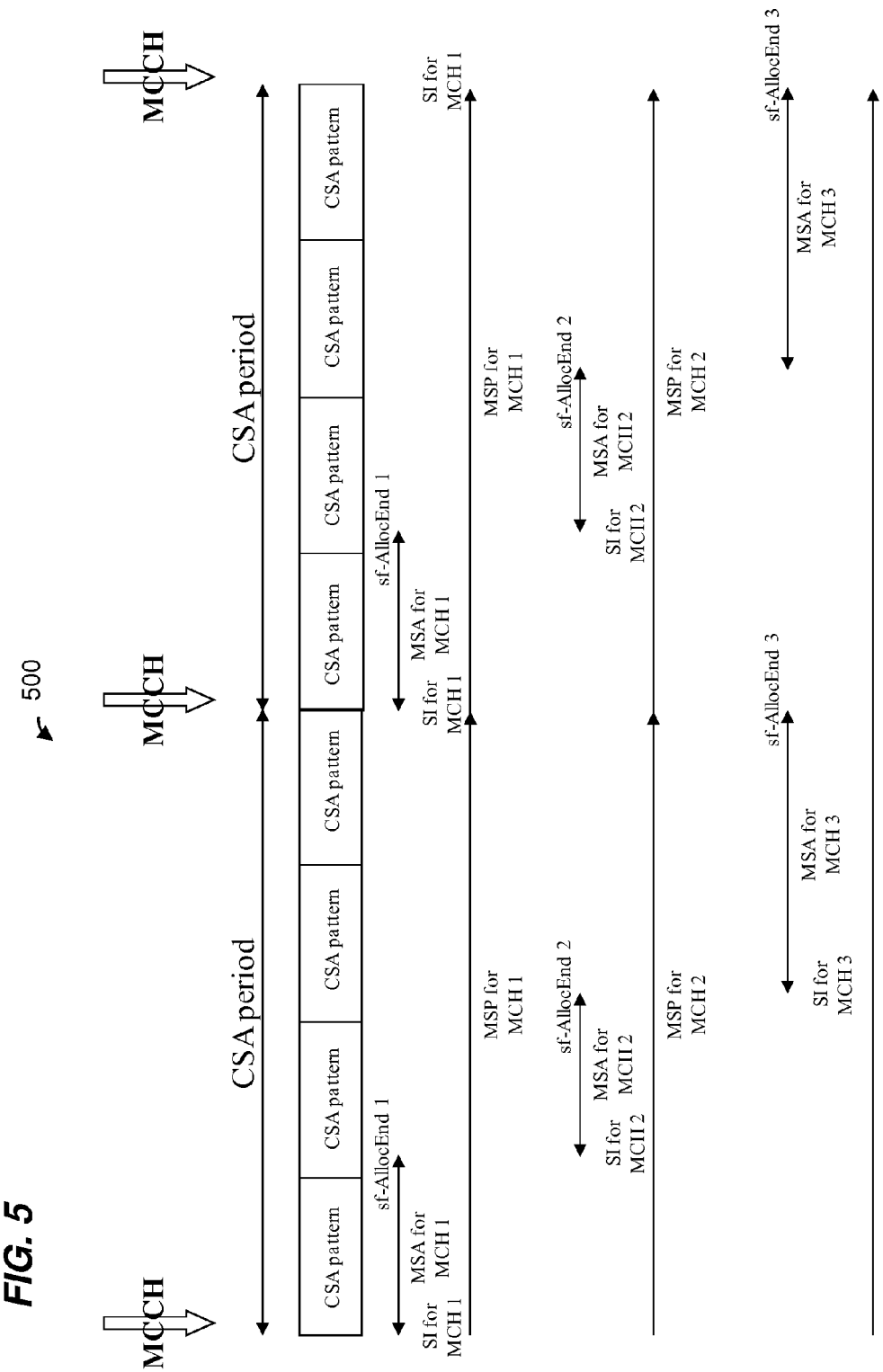
FIG. 5 is an example MBMS configuration utilizing a synchronized scheduling scheme, according to an embodiment.

FIG. 5 is an illustration of an example MBMS scheduling scheme 500 for a case in which $P_m \geq P_1$, according to an embodiment. In an embodiment, the scheduling scheme 500 is designed using the scheduling technique 400 or another suitable scheduling technique. In the scheduling scheme 500, MCCH is transmitted at the beginning of each CSA period and coincides with transmission of the MAC SI CE signal for MCH1, i.e., MCCH and MAC SI CE for MCH1 are included in the same MBMS subframe (or set of subframes). In other words, in this example embodiment, MBMS control signal parameters are selected such that each occurrence of MCCH transmission is synchronized with an occurrence of MAC SI CE for MCH1.

Figure 6:
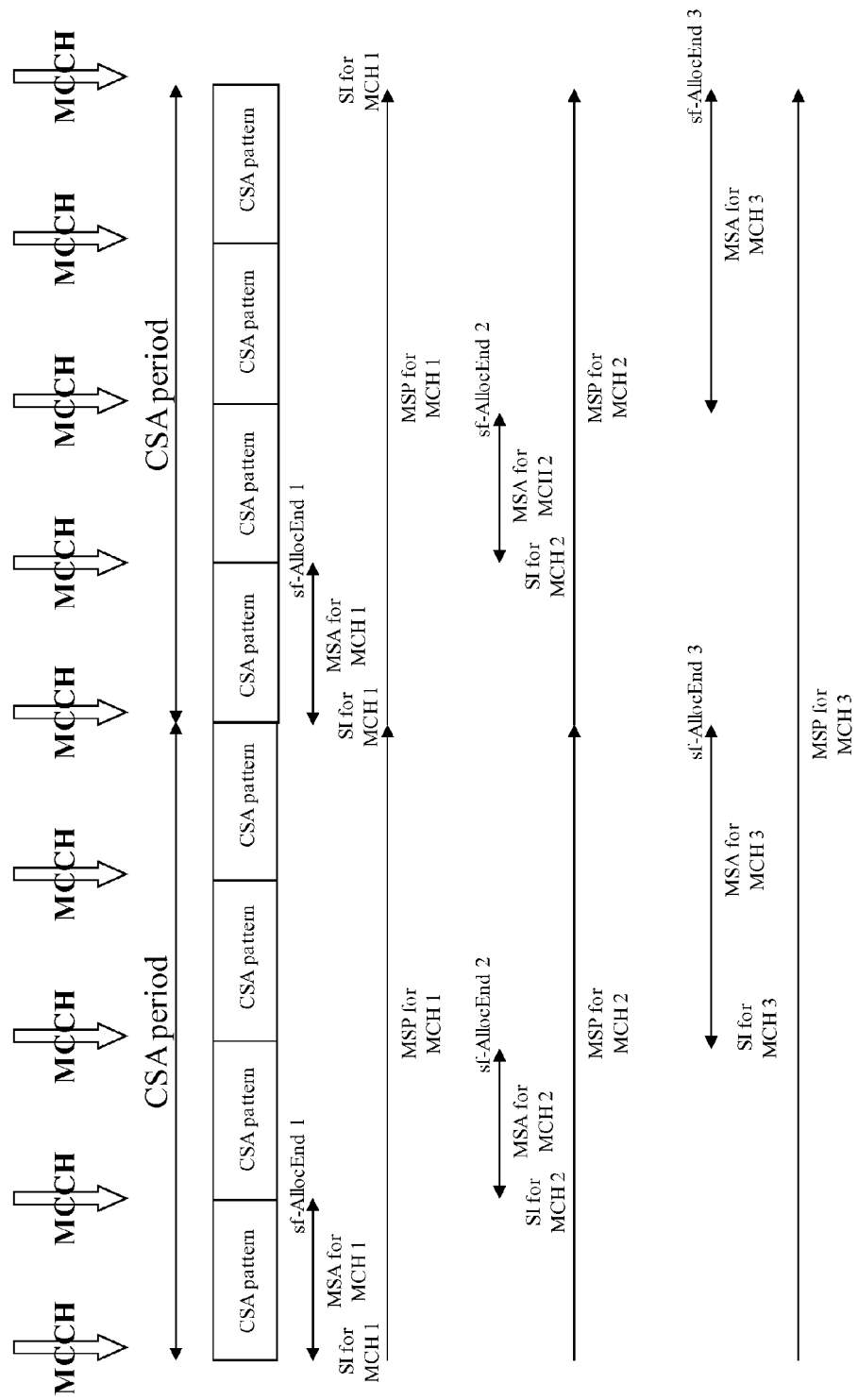
FIG. 6 is another example MBMS configuration utilizing a synchronized scheduling scheme, according to another embodiment.

FIG. 6 is an illustration of an example MBMS scheduling scheme 600 for a case in which $P_m < P_1$, according to an embodiment. In an embodiment, the scheduling scheme 600 is designed using the scheduling technique 400 or another suitable scheduling technique. In the scheduling scheme 600, each occurrence of MCCH is synchronized with an occurrence of a MAC SI CE, except for the case of MCH3 with a longer MSP. In this case, MCCH is transmitted more often than MAC SI CE for MCH3, and therefore, only some occurrences of MCCH are synchronized with MAC SI CE for this channel.

Figure 7:
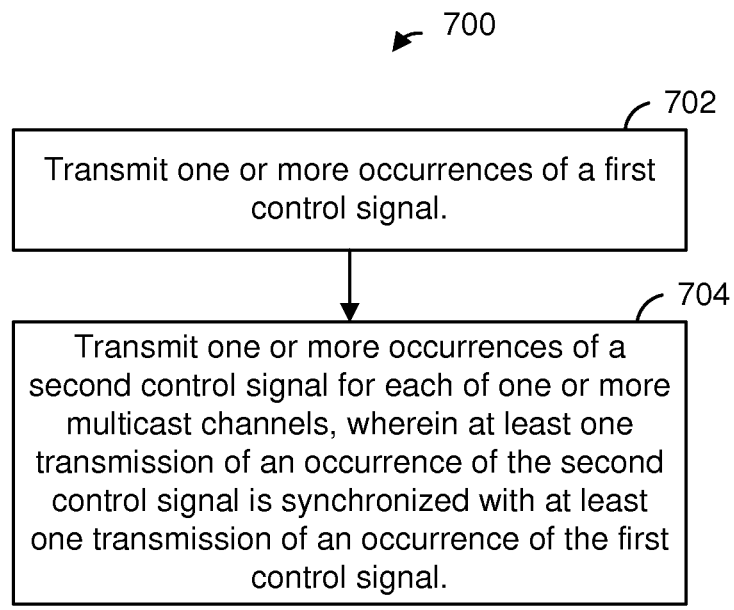
FIG. 7 is a flow diagram of an example method for transmitting control signals in a multicast communication system, according to an embodiment.

FIG. 7 is a flow diagram of an example method 700 for transmitting control signals in a multicast communication system, according to an embodiment. With reference to FIG. 1, the method 700 is implemented by the network interface 19, in an embodiment. For example, in one such embodiment, the network interface 19 includes a scheduler configured to implement at least parts of the example method 700. In other embodiments, the method 700 is implemented by another suitable unit included in the network interface 19, or by another suitable device.

At block 702, an occurrence of a first control signal is transmitted. In an embodiment, the first control signal includes control information corresponding to one or a number of multicast channels included in an MBMS. For example, in an embodiment, an occurrence of the MCCH 202 is transmitted at block 702.

At block 704, an occurrence of a second control signal is transmitted. In an embodiment, the second control signal includes control information corresponding to a particular multicast channel. For example, an occurrence of the MCH SI MAC CE1 206 or the MCH SI MAC CE2 214 (FIG. 2) is transmitted, according to an embodiment.

In an embodiment, the second control signal is transmitted at block 704 such that the transmission is synchronized with the occurrence of the first control signal transmitted at block 702. According to an embodiment, parameters for control signals of blocks 702 and 704 are determined using the scheduling technique 400. In another embodiment, the parameters for control signals of blocks 702 and 704 are determined using another suitable scheduling technique that allows at least some occurrences of multiple multicast control signals to be synchronized.

Figure 8:
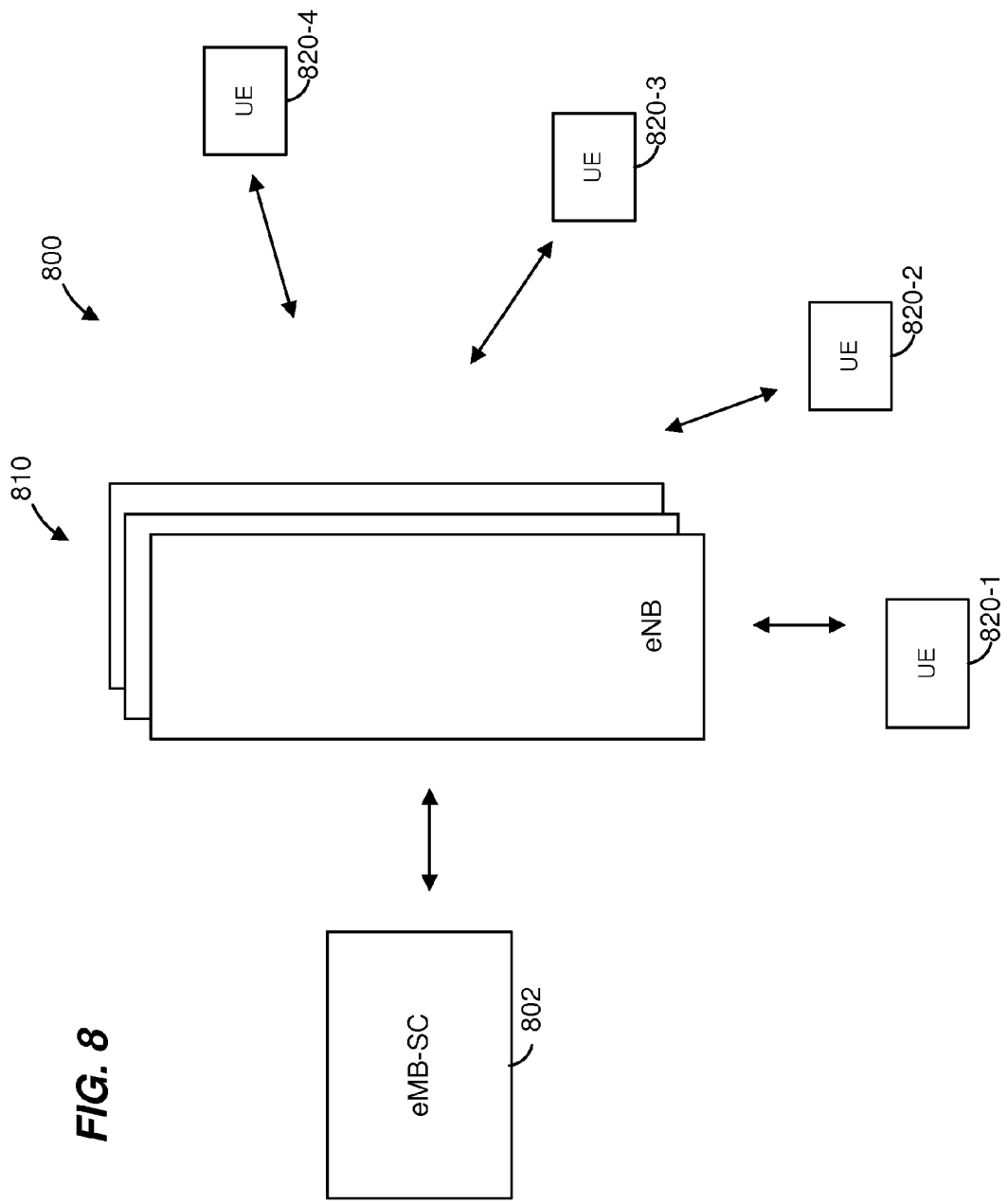
FIG. 8 is a block diagram of a wireless communication network in which multiple eNBs communicate with a plurality of UEs, according to an embodiment.

Techniques described herein are used in some embodiments and/or situations in which multiple eNBs broadcast the same MBMS data simultaneously to a plurality of UEs. FIG. 8 is an example block diagram of a wireless communication network 800 in which multiple eNBs 810 communicate with a plurality of UEs 820, according to an embodiment. Each eNB 810 corresponds to a cell in the communication network 800, for example. In an embodiment, each of the eNBs 810 has a structure the same as or similar to the eNB 14 illustrated in FIG. 1. Although three eNBs 810 are illustrated in FIG. 8, the network 800 includes different numbers (e.g., 2, 4, 5, 6, etc.) of eNBs 810 in various scenarios and embodiments. Each of the UEs 820 has a structure the same as or similar to the UE 25-1 illustrated in FIG. 1, according to an embodiment. Although four UEs 820 are illustrated in FIG. 8, the network 800 includes different numbers (e.g., 1, 2, 3, 5, 6, etc.) of UEs 25 in some embodiments or situations.

The network 800 includes an evolved broadcast multicast service center (eBM-SC) 802 (or a similar network device) which facilitates multicast transmissions from multiple eNBs 810 to all or a subset of the UEs 820, according to an embodiment. To this end, in an embodiment, the eMB-SC 802 receives data to be broadcast (e.g., from a content provider), performs MBMS scheduling, and transmits the scheduling information along with the MBMS data to multiple eNBs 810. In one embodiment, for example, the eMB-SC 802 forms an MBMS packet, including MBMS control signals (i.e., MCCH and MCH SI MAC CE control signals), and forwards the packet to each of the multiple eNBs 810. In another example embodiment, each of the multiple eNBs 810 forms a respective MBMS packet based on MBMS data and scheduling information that the eNB 810 receives from the eMB-SC 802. In any event, to schedule an MBMS service, the eMB-SC 802 implements a synchronized control signal scheduling technique, such as the scheduling technique 400, according to an embodiment. Consequently, in this embodiment, each of the multiple eNBs 810 transmits MBMS control signals (i.e., MCCH and MCH SI MAC CE control signals) in a synchronized manner as described herein (e.g. with respect to FIG. 7). In some embodiments, the eMB-SC 802 is further responsible for synchronizing the MBMS transmissions from multiple eNBs 810. Synchronized transmissions are used, for example, to broadcast MBMS services in a single frequency network (SFN) in which multiple eNBs broadcast the same MBMS content simultaneously and using the same frequency, according to an embodiment. In an embodiment, such simultaneous transmissions allow a receiving UE to constructively combine transmissions from multiple eNBs thereby improving reception quality (e.g., the signal to noise ratio (SNR)) of the received signals.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for transmitting control signals in a multicast communication system, wherein the multicast communication system broadcasts one or more multicast channels, the method comprising:

transmitting one or more occurrences of a first control signal, wherein the first control signal includes at least control information corresponding to each of the one or more multicast channels; and transmitting one or more occurrences of a second control signal for each of the one or more multicast channels, wherein each second control signal includes at least control information corresponding to the respective multicast channel, and wherein at least one transmission of an occurrence of the second control signal is synchronized with at least one transmission of an occurrence of the first control signal.

2. The method of claim 1, wherein transmitting one or more occurrences of the first control signal includes determining i) a period $P_m$ of transmission of the first control signal, ii) an offset $Q_m$ corresponding to a location of the first control signal within the period of transmission of the first control signal, and iii) a set of subframes $S_m$ suitable for transmission of the first control signal.

3. A method of claim 2, wherein transmitting one or more occurrences of the second control signal for each of the one or more multicast channels includes determining, for each multicast channel of the one or more multicast channels, i) a period of transmission $P_i$ of the second control signal, ii) an offset $Q_i$ corresponding to a location of the second control signal within the period of transmission of the second control signal, and iii) a set of sub frames $S_i$ suitable for transmission of the second control signal.

4. The method of claim 3, further comprising selecting a multicast channel $MCH_1$ of the one or more multicast channels to be transmitted first in a common subframe allocation period such that $P_1$ corresponds to a smallest $P_i$.

5. The method of claim 4, further comprising:
selecting $Q_m$ and $Q_1$ such that $Q_m=Q_1$; and
selecting $S_m$ and $S_1$ such that $S_m=S_1$.

6. The method of claim 5, further comprising selecting $Q_{j+1}-Q=n\, P_m$ if $P_m<P_1$, where j is an index corresponding to a multicast channel of the one or more multicast channels, and n is an integer.

7. The method of claim 5, further comprising selecting $S_m=S_i$ for each multicast channel of the one or more multicast channels if $P_m<P_1$.

8. The method of claim 2, wherein $P_m$ is a number of frames selected from the set $\{32, 64, 128, 256\}$.

9. The method of claim 3, wherein $P_i$ is a number of frames selected from the set $\{8, 16, 32, 64, 128, 256, 512, 1024\}$.

10. The method of claim 1, wherein at least one occurrence of the first control signal is synchronized with at least one occurrence of the second control signal such that MCS changes required for transmitting and/or receiving a corresponding multicast data stream are minimized.

11. An apparatus for transmitting control signals in a multicast communication system, wherein the multicast communication system broadcasts one or more multicast channels, the apparatus comprising:
a scheduler configured to:
schedule one or more occurrences of a first control signal, wherein the first control signal includes at least control information corresponding to each of the one or more multicast channels,
schedule one or more occurrences of a second control signal for each of the one or more multicast channels, wherein each second control signal includes at least control information corresponding to the respective multicast channel, and wherein at least one occurrence of the second control signal is scheduled to be synchronized with at least one occurrence of the second control signal; and
a network interface configured to transmit the one or more occurrences of the first control signal and the one or more occurrences of the second control signal.

12. The apparatus of claim 11, wherein the scheduler is configured to determine i) a period $P_m$ of transmission of the first control signal, ii) an offset $Q_m$ corresponding to a location of the first control signal within the period of transmission of the first control signal, and iii) a set of sub frames $S_m$ suitable for transmission of the first control signal.

13. The apparatus of claim 12, wherein the scheduler is also configured to determine, for each multicast channel of the one or more multicast channels, i) a period of transmission $P_i$ of the second control signal, ii) an offset $Q_i$ corresponding to a location of the second control signal within the period of transmission of the second control signal, and iii) a set of sub frames $S_i$ suitable for transmission of the second control signal.

14. The apparatus of claim 13, wherein the scheduler is also configured to select a multicast channel of the one or more multicast channels to be transmitted first in a common subframe allocation period such that $P_1$ corresponds to a smallest $P_i$.

15. An apparatus of claim 14, wherein the scheduler is further configured to select $Q_m$ and $Q_1$ such that $Q_m = Q_1$, and select $S_m$ and $S_1$ such that $S_m = S_1$.

16. The apparatus of claim 15, wherein the scheduler is further configured select $Q_j$ such that $Q_{j+1} - Q_j = n\,P_m$ if $P_m < P_1$, where j is an index corresponding to a multicast channel of the one or more multicast channels, and n is an integer.

17. The apparatus of claim 16, wherein the scheduler is further configured select $S_m$ and $S_i$ such that $S_m = S_i$ for each multicast channel of the one or more multicast channels if $P_m < P_1$.

18. The apparatus of claim 12, wherein the scheduler is configured to select $P_m$ from the set {32, 64, 128, 256}, wherein each number in the set correspond to a number of frames.

19. The apparatus of claim 13, wherein the scheduler is configured to select $P_i$ from the set {8, 16, 32, 64, 128, 256, 512, 1024}, wherein each number in the set correspond to a number of frames.

20. The apparatus of claim 13, wherein at least one occurrence of the first control signal is synchronized with at least one occurrence of the second control signal such that MCS changes required for transmitting and/or receiving a corresponding multicast data stream are minimized.

21. The method of claim 1, wherein the first control signal includes a session list indicating each of the one or more multicast channels;
wherein each second control signal includes a subframe indication for each multicast traffic channel associated with the corresponding multicast channel of the one or more multicast channels.

22. The method of claim 21, wherein the first control signal is a multicast control channel (MCCH) signal and each respective second control signal is a multicast channel scheduling information media access control control element (MCH SI MAC CE) signal.

23. The method of claim 1, wherein the at least one transmission of the occurrence of the second control signal is transmitted in a same subframe as the at least one transmission of the occurrence of the first control signal with which it is synchronized.

* * * * *